July 14, 1936.　　　　M. D. THOMAS　　　　2,047,527
AUTOMATICALLY MEASURING TRACES OF GASES
Filed Feb. 25, 1933　　　2 Sheets-Sheet 1

INVENTOR
Moyer D. Thomas
BY
Austin & Dix
ATTORNEYS

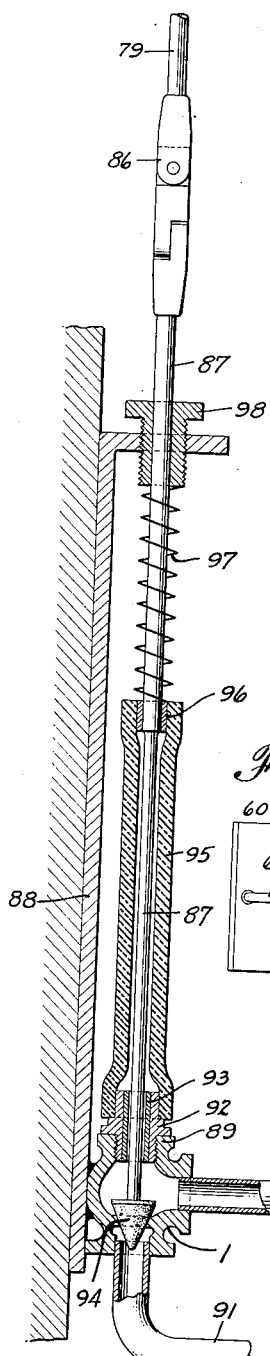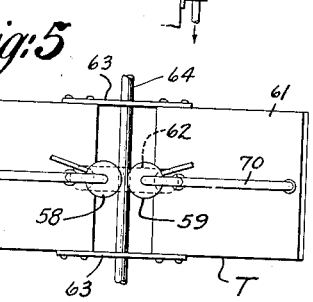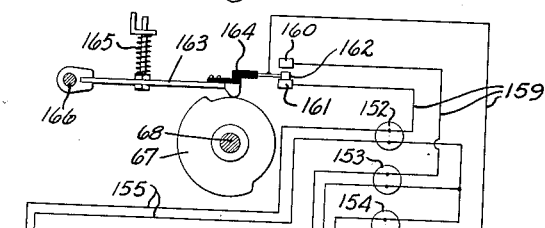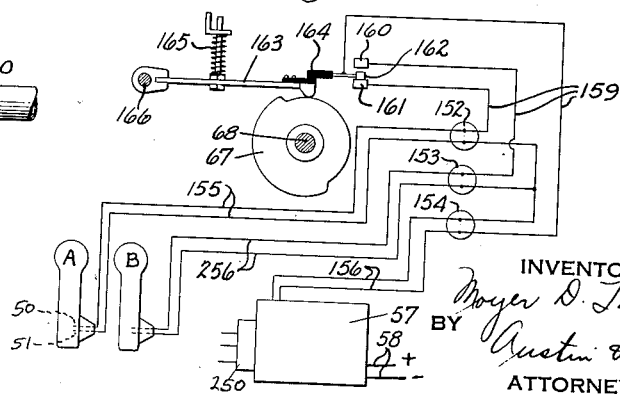

Patented July 14, 1936

2,047,527

UNITED STATES PATENT OFFICE 2,047,527

AUTOMATICALLY MEASURING TRACES OF GASES

Moyer D. Thomas, Salt Lake City, Utah, assignor to American Smelting & Refining Company, New York, N. Y., a corporation of New Jersey Application February 25, 1933, Serial No. 658,545

9 Claims. (Cl. 23—256)

The invention relates to the measurement of small concentrations of gases, and more particularly to apparatus for automatically measuring small concentrations of gases, such as carbon dioxide.

According to a preferred form of the invention, the apparatus may be mounted within a suitable portable compartment or casing. The apparatus may comprise a pair of absorbers to which a suitable reagent, such as a lithium or sodium hydroxide solution is fed and through which the air containing small concentrations of carbon dioxide to be tested may be aspirated. The effect of the carbon dioxide on the solution may be measured by ascertaining the change in resistance of the solution between a pair of electrodes.

If desired, the system may be arranged so that, while one absorber is aspirating the sample, the other may be draining the used reagent and may be filling with fresh reagent. In some cases, especially when the system is used with a testing cabinet for measuring the absorption of carbon dioxide by plants, it may be desirable to measure the concentration of the carbon dioxide at both the inlet and the outlet of the testing cabinet.

In this case, if desired, the absorbers may be reversed periodically with respect to the inlet and outlet points for accuracy. For further accuracy, arrangement may be made to aspirate pure air at predetermined intervals.

According to the invention, the various events are automatically controlled, for example, by suitable shafts and cams. If desired, provision may be made to suspend certain operations, such as filling and dumping the reagent in an absorber so that a plurality of aspirations may be made through the same reagent to obtain an accumulative effect.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents diagrammatically the system according to the invention;

Fig. 2 is a detail illustrating the valve operating mechanism;

Fig. 3 is a detail showing the construction of one of the valves;

Fig. 4 is a detail of an absorber;

Fig. 5 is a plan view of the steel mercury air meter, and

Fig. 6 is a wiring diagram illustrating the transfer of the measuring instrument from one absorber to the other.

Figure 1:
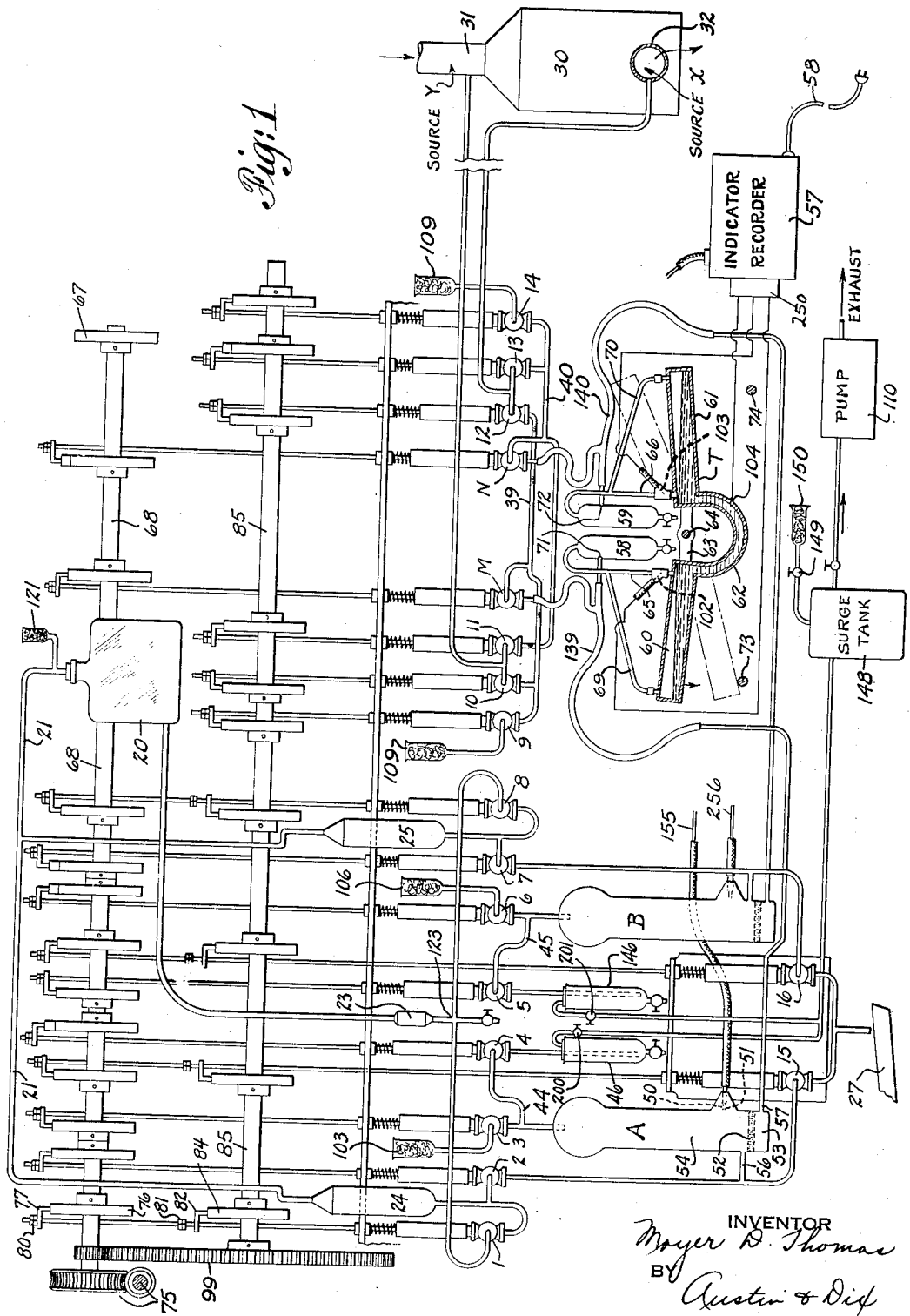

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, the various valves for controlling the several events are indicated by reference characters 1–16, inclusive and M, N. The entire apparatus is mounted within a portable cabinet or chamber (not shown) which may be carried about from place to place, if desired.

Located at the top of the cabinet is a suitable bottle of reagent 20. The reagent may flow by gravity through a glass wool filter 23 to a joint 123, whence it may flow to the supply valves 1 and 8. From the supply valves 1 and 8, the reagent may flow to pipettes 24 and 25 respectively, which may be of 40 c. c. capacity. These pipettes are for the purpose of measuring the amount of reagent fed to the absorbers A and B. The pipettes terminate above in long 0.8 mm. capillary tubing which extend along and to a point above the top of the supply bottle 20. The two capillaries communicate with each other and with the top of the supply bottle through glass tubing 21 and also with the outside air through a soda lime tube 121 which admits carbon dioxide free air as the solution is withdrawn.

From pipettes 24 and 25, the reagent may flow by gravity through valves 2 and 7 respectively to fill absorber tubes A and B. Air outlet valves 3 and 6 respectively are provided to let the air escape when the absorbers A and B are being filled. Valves 3 and 6 also admit carbon dioxide free air when the absorbers are drained, soda-lime tubes 103 and 106 being provided.

At the bottom of the absorbers A and B are drain valves 15 and 16 respectively for draining the used reagent to any suitable place, such as, a drain 27.

The testing cabinet is indicated diagrammatically by 30 and has an inlet 31 and an outlet 32 through which the air containing carbon dioxide passes. The material, such as a plant or animal, whose absorption of carbon dioxide is to be tested, is contained in the cabinet 30. It is desired to measure the concentration of carbon dioxide both at the inlet and outlet of the cabinet and these points are denoted for convenience by X and Y.

For aspirating the gas samples through the absorbers, a suitable pump 110 is provided for sucking the gases from the points X and Y. The conduits from the sources X and Y pass to transfer valves 12, 13, 10 and 11 respectively. Pipe 39 connects valves 10, 12 and pure air valve 9 together and to aspirator valve M. Pipe 139 connects valve M to one side of steel mercury air meter T and to the lower chamber 53 of absorber A. Pipe 40 connects valves 11, 13 and pure air valve 14 together and to aspirator valve N. Pipe 140 connects valve N to the other side of meter T and to the lower chamber of absorber B.

Pure air valves 9 and 14 lead to tubes 109 filled with soda-lime. As is known by those skilled in the art, soda-lime is a mixture of sodium hydroxide and calcium oxide (quicklime). Pure air drawn through this mixture has carbon dioxide removed by it.

Suction pipes 44 and 45 respectively pass out of absorbers A and B to suction valves 4 and 5 respectively which are connected to traps 46 and 146. These traps in turn are connected to needle valves 200 and 201, both of which are connected through surge tank 148 to the small steady suction pump 110 mentioned above. This pump may be a Crowell pump.

The surge tank 148 may be a one gallon bottle maintained at a constant reduced pressure and may be connected to atmosphere through a stop cock 149 and steel wool filter 150. The surge tank is desirable on account of the low pressure made necessary by the resistance of the porous glass septums of the absorbers as explained hereinafter.

For measuring the effect on the conductivity of the reagent by the gas to be tested, each absorber is provided with a pair of electrodes through which a current is passed, the amount of which is indicated by a suitable meter. These electrodes are denoted by 50 and 51 in absorber A (Fig. 4).

Referring now more particularly to Fig. 4, the absorbers A and B are identical in construction, so a description of absorber A will suffice for both. This comprises an absorption tube of pyrex glass having a suction outlet 55, a suction inlet 57, and a port 56 for the filling and emptying of the reagent.

Located in the bottom of the absorber is a porous glass septum 52 comprising disc of fritted pyrex glass, dividing the absorber into a lower chamber 53 and an upper chamber 54. Lower chamber 53 is made as small as possible to minimize trapping of liquid in this space. The disc is made of 150 to 200 mesh powdered glass heated until sintered and fused into the absorber tube. This provides a bottom wall for the chamber 54 which serves to break up the gas stream into bubbles of diameters of the order of less than half a millimeter.

Located in an enlarged portion of the wall of chamber 54 are the two electrodes 50 and 51 for measuring the conductivity of the reagent as hereinafter explained more in detail.

Referring now to Figs. 1 and 5, the steel mercury air meter T comprises a pair of steel boxes 60 and 61 connected by a U-shaped conduit 62, all parts being suitably welded together. A pair of bars 63 connect the boxes 60 and 61 for pivoting the meter on pivot rod 64. Secured to the boxes 60 and 61 are traps 58 and 59, the tops of which are connected by glass tubes 69, 65 and 70, 66 to boxes 60 and 61 respectively.

Between the top and bottom of trap 58 is a port 71 which communicates with flexible pipe 139 communicating with control valve M and absorber A. Similarly, between the top and bottom of trap 59 is port 72 communicating with flexible conductor 140, communicating with control valve N and absorber B.

Located in tubes 65 and 66 are insulated contacts 102 and 103 respectively. Secured to another part of the steel casing 62 is a contact 104. The boxes 60, 61 and conduit 62 contain mercury to the extent indicated.

Stops or bumpers 73 and 74 are provided for limiting the tipping movement of the meter. It will be understood that the flexible connections permit this tipping movement.

It will be understood that the space left in one box, when the mercury fills the other box, measures the volume of gas tested. Also it will be noted that, when each box is tipped to its lower position, the mercury rises in the adjoining tube sufficiently to make electrical connection with the insulated electrode 102 or 103. The mercury is continuously in electrical connection with contact 104. Contacts 102, 103 and 104 are connected to an auxiliary relay 250 on recorder 57. As the air meter T oscillates, operation of the relay records the fact that full gas samples are aspirated.

The operation of the air meter T is as follows:

Suction is admissible to absorbers A and B under control of suction valves 4 and 5 and two needle valves 200 and 201. Control valves M and N in conjunction with suction valves 4 and 5 determine the operation of the meter T.

When absorber A is aspirating, valve 4 is open, valve 5 is closed, and valve M is closed to permit the exhausting of air from box 60 (it being understood that at the beginning of the aspirating period for absorber A, the meter T rests against stop 74).

As the box 60 is being exhausted of gas, the mercury starts to rise therein and, when the air in box 60 is all exhausted, the mercury makes contact with contact 102 causing the auxiliary relay on the recording Wheatstone bridge 57 to indicate the fact that the complete air sample was withdrawn.

During the time the gas in box 60 is being exhausted, valve N is open, and valve 5 is closed so that the dropping of the mercury level in box 61 sucks gas from valve N. After box 60 engages stop 73 and contact is made between the mercury and contact 102, the events are so timed that valve N closes, valve M opens, valve 5 opens and valve 4 closes, thereby causing aspiration of the sample of gas in the box 61 through absorber B in a manner similar to that described above.

The wiring diagram is shown best in Fig. 6 and contains an arrangement for alternately connecting the recording meter 57 first to one absorber A and then to the other absorber B. For this purpose the upper or main cam shaft 68 is provided with a cam 67 which operates a follower 163 pivoted at 166 and normally held against the cam face by spring device 165. Follower 163 carries insulation 164 which in turn carries movable contact 162, which alternately engages fixed contacts 160 and 161.

If desired, for convenience, connectors 152, 153 and 154 may be provided. Wires 155 connect the electrodes of absorber A to connector 152. Wires 256 connect the electrodes of absorber B to connector 153 and wires 156 connect the recording meter 57 to connector 154. These connectors are wired together as shown and are provided with three wires, indicated by 159, which connect the movable and fixed contacts 162, 161 and 160. A source of alternating current is connected to the recording meter 57 by wires 58. The recording meter may be any well known type suitable for such purposes, for example, a Leeds & Northrup recording Wheatstone bridge having a paper speed of eight inches per hour.

The timing is so arranged that the conductance of the solution in one aspirator must be measured while the solution in the other aspirator is being aspirated, it being impossible to read the resistance of the solution during aspiration since the absorber is almost completely filled with air bubbles at that time.

The time period for aspirating each sample is fixed by the speed of rotation of the upper cam shaft 68 and the needle valves 200 and 201 (two are necessary since the air resistances in the two absorbers are not identical) are adjusted so that the full air sample is drawn in about 90 to 95% of the allotted time period. The glass wool filter traps 46 and 146 prevent moisture or spray from interfering with the operation of the needle valves 200 and 201.

As above stated, the cabinet or casing in which the apparatus for measuring the gas is contained, may be of any suitable construction, being made of suitable structural frame members to which wall plates are secured. For driving the various apparatus, an electric motor (not shown) may be provided. This motor may also drive the suction pump 110. The motor may also drive the upper main shaft 68 by a worm and worm wheel indicated by 75.

The upper main shaft 68 may move at any desired or necessary speed as, for example, one revolution every six minutes. If desired, for controlling the various events, for reasons explained more fully below, a second shaft 85 may be provided, driven by gears 99 from shaft 68 at a considerably lower speed as, for example, one revolution every ninety-six minutes. It will be noted that each of the shafts 68 and 85 have cams thereon which operate followers, which in turn operate the several valves which control the various events. Since these cams, followers and valves are similar in construction only one will be described in detail.

Referring now to Fig. 2 valve 1 may be placed under control of either cam 76 or cam 84. As shown, the valve spindle 87 is connected to rod 79 through a flexible coupling 86. Rod 79 has a pair of lock nuts 80 in engagement with follower 77 pivoted at 78, and a second pair of lock nuts 81 adapted to be placed in engagement with follower 82 pivoted at 83, as will be explained more in detail below.

Referring now to Fig. 3, the valve 1 comprises a casing 89 to which the inlet pipe, denoted by 90, is connected and to which the outlet pipe, denoted by 91, is also connected. A conical rubber policeman tip, indicated by 94, seats on a suitable conical seat and is connected to valve spindle 87 as shown.

For guiding the spindle 87, a sleeve 92 is provided having a Babbitt lining 93. A sleeve 96 is secured to the spindle and a long length of yieldable rubber pipe 95 is tightly secured to sleeves 96 and 92.

The entire valve arrangement may be soldered or otherwise secured to a support 88 through which an adjusting sleeve 98 may be threaded between which and the sleeve 96, coil spring 97 is positioned. As the cams 84 or 76 raise their followers, the spindle 87 will be pulled up against the spring 97, lifting the tip 94 off its seat and stretching the rubber boot 95, but insuring a fluid tight joint at the valve.

It will be understood that valves 2 and 3 are operated by the same shape cams run in unison and that valves 6 and 7 are also operated by the same shape cams run in unison. Likewise, valve 3 runs in unison with valve 15 and valve 6 runs in unison with valve 16. This is for the reason that whenever the absorbers A and B are being filled or drained, provision must be made at the same time to let the air escape or enter.

It will be further noted that supply valves 1 and 8 may be operated by either shaft 68 or 85, as is also true of the drain valves 15 and 16. As shown, these valves are not normally operated by the lower shaft, since the nuts 81 are in upper position. By placing the nuts 81 in lower position and raising the upper nuts 80, these valves, namely, 1, 8, 15 and 16, may be operated by the lower shaft 85 instead of the upper shaft 68 for preventing periodic draining and refilling of these absorbers for each aspiration, and causing repeated aspirations in the same reagent to obtain an accumulative effect. This may be very desirable in the case of measuring very small concentrations.

It is thought that the operation of the system will be apparent from the description given above, it being understood that the various cams are arranged to open the various valves at the desired time to obtain the results desired.

For example, absorbers A and B may be operated upon a six minute cycle. Absorber A aspirates for three minutes while absorber B is draining and refilling for the same period of time; absorber A then draining and refilling for the remaining three minutes, while absorber B is aspirating for the same period of time.

On account of the necessity of measuring the conductance of the solution after the completion of the aspiration, a shorter cycle, such as a four minute cycle, is hardly adequate when the absorbers must be drained and refilled after each absorption. For the accumulated-sample method of operation, the four minute cycle is quite satisfactory.

When used in connection with the testing cabinet 30, each absorber may be connected to take its sample from one of the sources X and Y, the other absorber being connected to the other source. Furthermore, each absorber may take one aspiration of pure carbon dioxide free air after a predetermined number of samples has been taken. For example, absorber A may take one aspiration of pure air and then seven consecutive aspirations from source X. B in between times will take one aspiration of pure air and seven consecutive aspirations from source Y. Then A and B may each take a single aspiration of pure air after which A may take seven consecutive aspirations from source Y, while B takes seven consecutive aspirations from source X in between times. The advantage of taking periodic aspirations of pure air gives a check on the apparatus and the advantage of transferring the sources X and Y with respect to the absorbers A and B acts to check up any difference there may be in the separate absorber systems.

In case it is desired to take repeated aspirations through the same reagent to obtain an accumulative effect with very rare concentrations, it is only necessary to place the valves 1, 8, 15 and 16 under the exclusive control of shaft 85 which prevents periodic draining and refilling of the absorbers for a given length of time, for example thirty-two minutes.

For measuring the concentration of carbon dioxide, the reagent or absorbing solution may be 0.005 normal sodium hydroxide, containing a surface tension depressant, which causes the liquid to foam and the bubbles to remain in contact with the absorbing solution for a much greater period of time than would be the case without any depressant. If desired, a lithium hydroxide solution may be used instead of sodium hydroxide.

For the depressant, normal butyl alcohol may be used in a concentration depending upon the size of the bubbles formed and the velocity of the gas which will give the desired amount of foaming. This concentration ranges from 0.1% to over 1% in different types of absorbers. Other surface tension depressants may be used but are preferably confined to a group of non-electrolytes, such as the higher alcohols.

The use of the surface tension depressant permits the complete absorption of the carbon dioxide from the air, which is practically impossible without it, unless much higher concentrations of alkali are used.

The use of lithium or sodium hydroxide is superior to the use of, for instance, barium hydroxide, because an appreciable time period is required for the latter after the formation of the precipitate before an equilibrium value of the conductance is reached, with an attendant decrease in solubility of this constituent of the system.

The change in the conductance of the solution or reagent when the hydroxide is converted into carbonate by the carbon dioxide gas, as indicated on the recording Wheatstone bridge, gives a measure of the amount of gas absorbed. The indication of conductance is made precise by having the proper range on the conductivity recorder. In one form used, the conversion of 0.005 normal hydroxide to carbonate caused the recorder to traverse nearly the complete width of the paper; the recorder indications are nearly a linear function of the proportion of hydroxide and carbonate.

It is important that the box or compartment containing the apparatus be kept at a precise temperature and the apparatus calibrated accordingly. Still better operation is insured by mounting the absorbers in a small water thermostat (10"x 10"x 4") with glass tubes soldered in the bottom for draining the absorbers and a glass window on the side to make observation of the apparatus easy.

In the case of measuring absorption by plants, the two minute aspirating time of each absorber is sufficiently small so that the samples from the intake and outlet in the fumigation cabinet 30 may be considered to be taken virtually simultaneously, and results will be accurate unless the concentration in the cabinet is fluctuating rapidly. In the case of very short tests of the order of fifteen minutes or less, it may be desirable to use two machines.

It will be understood that the machine may be modified such as to obtain different periods of aspirations and certain features may be eliminated, if desired. Also other gases may be measured and other reagents may be used.

While certain novel features of the invention have been disclosed and are pointed out in the annexed claims, it will be understood that various omissions, substitutions and changes may be made by those skilled in the art without departing from the spirit of the invention.

What is claimed is:

1. In a system for measuring traces of gases, first and second absorbers, a source of suction, a source of gas sample, a double compartment volume meter between said gas sample source and said absorbers, means for alternately filling and draining said absorbers of reagent, first one then the other, means for alternately connecting said suction source to said absorbers, means for connecting one compartment of said meter to one absorber while the other compartment is connected to said gas sample source, and vice versa, and means for testing the reagent in said absorbers.

2. In a system for measuring traces of gases, an absorber having a high resistance partition, a suction pump, a surge compartment between said pump and one side of said partition, a gas inlet on the other side of said partition, and means for filling said absorber with reagent.

3. In a system for measuring traces of gases, first and second absorbers having gas inlets and outlets respectively, first and second suction valves connected to said absorber outlets respectively, a source of suction connected to said valves, a gas meter comprising a pivoted member having connected first and second measuring compartments, a liquid in said meter, a source of gas to be tested, first and second control valves connected to said source, said first control valve communicating with the inlet of said first absorber and said first compartment, said second control valve communicating with the inlet of said second absorber and said second compartment, a pair of electrodes in each absorber, an electric meter having an auxiliary relay, connections between said auxiliary relay and gas meter, whereby the rocking of said gas meter operates said relay to indicate aspiration of full gas samples, and means for closing each control valve and opening the corresponding suction valve while opening the other control valve and closing the corresponding suction valve, and means for alternately connecting the electrodes in each absorber to said electric meter to measure the conductance of the solution.

4. In a system for measuring traces of gases, first and second absorbers having gas inlets and outlets respectively, first and second suction valves connected to said absorber outlets respectively, a source of suction connected to said valves, a gas meter comprising a pivoted member having connected first and second measuring compartments, a liquid in said meter, a source of gas to be tested, first and second control valves connected to said source, said first control valve communicating with the inlet of said first absorber and said first compartment, said second control valve communicating with the inlet of said second absorber and said second compartment, means for testing the reagent in each absorber, and means for closing each control valve and opening the corresponding suction valve while opening the other control valve and closing the corresponding suction valve.

5. Apparatus for determining traces of gases comprising, two sources of gas samples, a double chamber rockable metering device, a pair of testing devices, each connected to a chamber of said metering device respectively, means for periodically connecting said chambers alternately to their respectively connected sources, means for rocking said metering device for alternately measuring gas samples in said chambers, means for delivering to said absorbers alternately from their respectively connected chambers measured samples of gas, means for actuating said testing devices and means for switching said chambers with respect to the sources.

6. Apparatus for determining traces of gases comprising, first and second sources of gas samples, first and second testing chambers, first and second metering means associated with each of said chambers respectively for supplying thereto a measured sample of gas, means for alternately actuating said metering means, means for periodically connecting said metering means to said sources of gas samples respectively and in alternation and means for periodically switching said metering means with respect to said sources.

7. Apparatus for determining traces of gases comprising, a test chamber, means for taking samples of gas entering the chamber and means for taking samples of gas leaving the chamber, a metering device having a pair of compartments connected to said sample taking means respectively, a pair of absorbers, connected to said compartments respectively, testing means in said absorbers, means for actuating said metering device to deliver successive measured samples of the gas entering said chamber to one of said absorbers and to deliver successive measured samples of the gas leaving said chamber to the other absorber alternately and means for periodically switching said absorbers with respect to said sample taking means.

8. Apparatus for determining traces of gases comprising an absorber having a porous atomizing partition adjacent the bottom thereof, a gas inlet below said partition, a liquid inlet above said partition testing means projecting into said absorber above said partition, a gas outlet above said partition, means for introducing a liquid testing reagent into said absorber, suction means connected to said gas outlet and means controlling the periodic introduction of liquid testing reagent and gas samples into said absorber and the removal thereof from said absorber.

9. Apparatus for determining traces of gases comprising a pair of absorbers, each having a porous atomizing partition, a gas inlet below the partition, a gas outlet above the partition and a liquid inlet above the partition, and means for filling one absorber with liquid testing reagent while introducing a gas sample into the other absorber and means for introducing gas samples into said absorbers alternately.

MOYER D. THOMAS.